April 8, 1958     W. S. HENKELMAN     2,829,832
VEHICLE COUNTERS
Filed Oct. 30, 1956
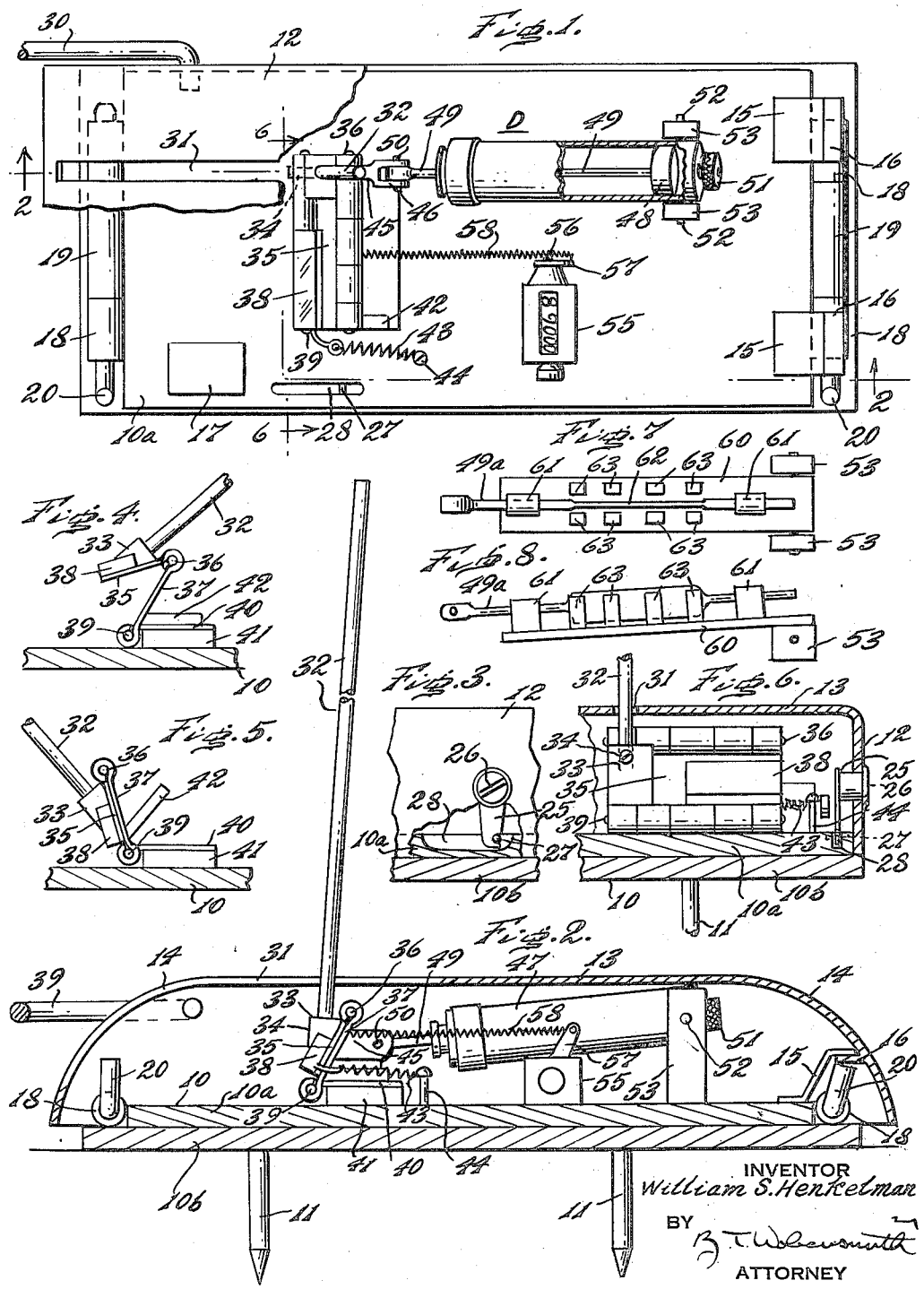
INVENTOR
William S. Henkelman
BY
ATTORNEY

United States Patent Office 2,829,832
Patented Apr. 8, 1958

2,829,832

VEHICLE COUNTERS

William S. Henkelman, Egg Harbor City, N. J.

Application October 30, 1956, Serial No. 619,250

6 Claims. (Cl. 235—99)

This invention relates to vehicle counters and more particularly to a structure which may be employed in a roadway, at the entrance to a parking lot, or at any other desired location, for counting the number of vehicles passing thereover.

Various devices have heretofore been proposed for counting motor vehicles but the apparatus heretofore available has not been satisfactory for various reasons.

One suitable form of motor vehicle counter is shown in my prior application, Serial No. 515,634, filed June 19, 1955, now Patent No. 2,782,990, dated February 26, 1957, which is particularly adaptable for permanent types of installations.

It is the principal object of the present invention to provide a further improved counter for motor vehicles and the like which is simple and sturdy in construction, reliable in its operation and which is better adapted for movement, as desired, from one location to another.

It is a further object of the present invention to provide a counter for motor vehicles and the like with which a count is obtained upon movement thereover in one direction but in which no count is made upon movement thereover in the opposite direction.

It is a further object of the present invention to provide a counter for motor vehicles which will be free from the likelihood of false recordings.

Other objects and advantageous features of the invention will be apparent from the specification and claims.

The nature and characteristic features of the invention will be more readily understood from the following description, taken in connection with the accompanying drawings forming part thereof, in which:

Figure 1 is a top plan view of a vehicle counter in accordance with the invention, parts of the upper housing being broken away to show the internal construction;

Fig. 2 is a vertical sectional view taken approximately on the line 2—2 of Fig. 1;

Fig. 3 is a fragmentary view, partly in elevation and partly in vertical section, showing the cover lock;

Fig. 4 is a diagrammatic view illustrating one character of operation of the counter for non-recording movement;

Fig. 5 is a fragmentary view similar to Fig. 4 showing the operation for recording movement; and Fig. 6 is a fragmentary sectional view taken approximately on the line 6—6 of Fig. 1.

Fig. 7 is a plan view of an alternate form of restraining means for the plate 37.

Fig. 8 is an elevation thereof.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, the counter in accordance with the present invention preferably includes a base plate 10 having an upper plate section 10a and a lower plate section 10b, of relatively rigid material, the section 10b being provided with a plurality of spikes 11 secured thereto and extending downwardly therefrom for holding the same in position at the desired location for use. The base plate 10 preferably has extending thereover a cover 12 with a substantially flat top 13, and downturned end portions 14. The total height of the top of the cover 12 above the ground is of the order of three inches. The plate section 10a has brackets 15 extending outwardly for engagement with ears 16 carried by the cover 12 at one end thereof and with stop plates 17 for centering the cover 12. Pin sockets 18 and 19 are provided at each end of the base plate sections 10a and 10b for the reception of holding pins 20 which retain the sections 10a and 10b in assembled relation but permit the separation, if desired.

A pivotally mounted lock lever 25, carried by the cover 12 and operable only by a suitable coded key (not shown) insertable through a keyhole 26 is provided, for engagement with a locking pin 27 in a locking slot 28 in the base section 10a.

A pivotally mounted handle 30 is also provided on the cover 12 and extending through the side walls of the cover 12 for moving the counter from one place to another upon separation from the base section 10b by withdrawal of the pins 20, or in its entirety, if desired.

The cover 12 has a slot 31 formed therein for the movement of a flexible actuating rod 32 which may be made of steel, glass, plastic impregnated fiber glass, synthetic plastic or other desired materials. The rod 32 is of a height such as to be moved by a vehicle moving thereagainst as hereinafter explained.

The rod 32 is carried in a socket 33 and can be secured therein in any desired manner such as by a set screw 34. The socket 33 is mounted on a plate 35 which is pivotally carried on an upper hinge pin 36 to which a hinge plate 37 is also pivotally connected. A weight 38 can be secured to the plate 35 to urge it downwardly. The hinge plate 37 is carried on a lower hinge pin 39 from which a mounting hinge plate 40 extends, the mounting plate 40 being secured to a mounting block 41 secured to the base section 10a. The plate 37 is provided with a stop arm 42 for limiting the movement of the plate 37 in one direction (see Fig. 4) but permitting movement in the opposite direction with respect to the lower hinge pin 39 (see Fig. 5). The plate 35 has one end of a tension spring 43 connected thereto at the lower part thereof, the opposite end of the spring 43 being connected to a post 44 carried on the base section 10a.

The plate 37 has an arm 45 with a bifurcated end 46 connected thereto for the attachment of a restraining mechanism. One suitable form of restraining mechanism consists of a dash pot D. The dashpot D can be of the type having an external cylinder 47 with an internal piston 48 carried by a piston rod 49 which is pivotally connected by a pin 50 to the end 46. The end of the cylinder 47 opposite the rod 49 can be provided with an adjustable valve 51 to control the restraining force exerted by the dashpot D.

The cylinder 47, as illustrated, is pivotally mounted by pins 52 on uprights 53, carried by the base section 10a.

A register 55 is provided, preferably of the type having an internal return spring (not shown) and a shaft 56 on which an operating lever 57 is clamped.

Interposed between the operating lever 57 and the plate 37 and connected thereto, a tension spring 58 is connected for actuating the register upon movement in one direction.

In Figs. 7 and 8, an alternative form of restraining mechanism is illustrated which comprises a supporting plate 60, pivotally mounted on the uprights 53 and having a rod 49a with an end for pivotal connection to the bifurcated end 46.

The supporting plate 60 is provided with spaced guides 61 for the rod 49a which, at the central portion thereof, is provided with a plate 62, preferably of magnetic responsive material, and a plurality of magnets 63, preferably of ultra strong magnetic material such as that available under the trade name "Alnico," is provided on opposite sides of the plate 62 to act as a restraining device in a manner comparable to the dashpot D.

The mode of operation will now be pointed out.

The base plate 10 and the other structure thereon including the protective cover 12, is mounted on the surface of the ground, or of the roadway at the location where the count is to be taken and with the pins 11 projecting downwardly into the ground. The rod 32 will extend substantially vertically above the cover 12 and upon the movement of the bumper or other part of a vehicle thereagainst the rod 32 will be moved downwardly about one or the other of its pivotal axes.

Upon movement from the right, as seen in Figs. 2 and 5, the rod 32 will be impelled in a counterclockwise direction, moving the plates 35 and 37 together about the pivotal axis provided by the lower hinge pin 39. As the plate 37 moves, the movement is effective through the spring 58 for moving the register arm 57 to register a count. When the rod 32 is released by the vehicle passing therebeyond it will move to an upward position, being aided by the spring 43 and against the temporary impeding force exerted by the restricting device, and will be ready for another movement.

In the event of the actuation of the rod 32 in a clockwise direction, for a noncount operation, the stop 42 will limit the movement of the hinge plate 37 and the plate 35 will move around the axis provided by the upper hinge pin 36, as indicated in Fig. 4. By reason of the lack of movement of the plate 37, to which the register actuator arm 57 is connected at the spring 58, no count will be made on the register 55.

While in some instances the rod 32, upon return movement from an inclined to an upright position as shown in Fig. 4 may have a slight counterclockwise movement any tendency to actuate the counter 55 is reduced by the action of the restraining mechanism as well as by the spring 43 and no false counts need be obtained. It will be noted that the register or counter 55 is not accessible except upon removal of the cover plate 12 so that information as to the count on the register 55 is not available except to authorized persons having a coded key for removal of the cover plate 12.

I claim:

1. Motor vehicle counting apparatus comprising a base, a light and flexible rod extending upwardly from said base for engagement by the vehicle to be counted, a socket member in which the lower end of said rod is mounted, a mounting member for said socket member carried by said base for movement of said rod in a predetermined direction from an upright position, a resilient restoring member connected to said mounting member and said base for restoring said rod to upright position, count registering means, and connections between said mounting member and said count registering means for actuating said count registering means upon movement in a predetermined direction.

2. Motor vehicle counting apparatus as defined in claim 1 in which said mounting member comprises a hinge mechanism.

3. Motor vehicle counting apparatus as defined in claim 1 in which said mounting member comprises a multiple pivot hinge.

4. Motor vehicle counting apparatus comprising a base, a light and flexible rod extending upwardly from said base for engagement by the vehicle to be counted, means carried by said base for mounting said rod for movement in a clockwise or in a counterclockwise direction, count registering means, and connections between said mounting means and said count registering means for actuating said count registering means in a predetermined direction of said movement, said mounting means comprising a hinge plate on which said rod is carried, a second hinge plate pivotally connected to said first hinge plate, and a mounting plate to which said second hinge plate is pivotally connected, one of said hinge plates having therein a movement limiting member for limiting movement of said hinge plate in one direction.

5. Motor vehicle counting apparatus comprising a base, a light and flexible rod extending upwardly from said base for engagement by the vehicle to be counted, means carried by said base for mounting said rod for movement in a clockwise or in a counterclockwise direction, count registering means, and connections between said mounting means and said count registering means for actuating said last means in a predetermined direction of said movement, said mounting means comprising a first hinge plate on which said rod is carried, a second hinge plate pivotally connected by a horizontal pivot to said first hinge plate, and a mounting plate to which said second hinge plate is pivotally connected by a horizontal pin, a movement limiting member connected to said second hinge plate for limiting movement thereof in one direction, a motion restraining device connected to said second hinge plate, said first hinge plate having the connections to the registering means connected thereto, and said first hinge plate having a resilient position restoring member connected thereto.

6. Motor vehicle counting apparatus comprising a base, a light and flexible rod extending upwardly from said base for engagement by the vehicle to be counted, a socket member in which the lower end of said rod is mounted, a mounting member for said socket member carried by said base for movement of said rod in a clockwise or counterclockwise direction from an upright position, a resilient restoring member connected to said mounting member and said base for restoring said rod to upright position, a restraining member for controlling the return of said rod to upright position, count registering means, and connections between said mounting means and said count registering means for actuating said count registering means upon movement in a predetermined direction.

References Cited in the file of this patent

FOREIGN PATENTS

| 131,258 | Germany | May 29, 1902 |
| 551,134 | Great Britain | Feb. 9, 1943 |